United States Patent
Jung et al.

(10) Patent No.: US 9,881,746 B2
(45) Date of Patent: Jan. 30, 2018

(54) FLEXIBLE AND TRANSPARENT SUPERCAPACITORS AND FABRICATION USING THIN FILM CARBON ELECTRODES WITH CONTROLLED MORPHOLOGIES

(71) Applicants: Northeastern University, Boston, MA (US); William Marsh Rice University, Houston, TX (US)

(72) Inventors: Yung Joon Jung, Lexington, MA (US); Hyun Young Jung, Malden, MA (US); Pulickel M. Ajayan, Houston, TX (US)

(73) Assignees: Northeastern University, Boston, MA (US); William Marsh Rice University, Houston, TX (US)

( * ) Notice: Subject to any disclaimer, the term of this patent is extended or adjusted under 35 U.S.C. 154(b) by 42 days.

(21) Appl. No.: 14/391,458

(22) PCT Filed: Apr. 15, 2013

(86) PCT No.: PCT/US2013/036586
§ 371 (c)(1),
(2) Date: Oct. 9, 2014

(87) PCT Pub. No.: WO2014/011294
PCT Pub. Date: Jan. 16, 2014

(65) Prior Publication Data
US 2015/0332868 A1    Nov. 19, 2015

Related U.S. Application Data

(60) Provisional application No. 61/623,975, filed on Apr. 13, 2012.

(51) Int. Cl.
*H01G 11/36* (2013.01)
*H01G 11/56* (2013.01)
(Continued)

(52) U.S. Cl.
CPC ............. *H01G 11/36* (2013.01); *H01G 11/48* (2013.01); *H01G 11/56* (2013.01); *H01G 11/68* (2013.01);
(Continued)

(58) Field of Classification Search
CPC .......... H01G 9/028; H01G 9/025; H01G 9/12; H01G 9/15; H01G 11/04; H01G 11/28; H01G 11/42; H01G 11/32; H01G 11/66
See application file for complete search history.

(56) References Cited

U.S. PATENT DOCUMENTS 6,297,293 B1    10/2001    Bell
8,284,539 B2 *  10/2012    Lu ........................ H01G 11/24
                                                          361/502

(Continued)

*Primary Examiner* — Nguyen Ha
(74) *Attorney, Agent, or Firm* — Posternak Blankstein & Lund LLP

(57) ABSTRACT

Mechanically flexible and optically transparent thin film solid state supercapacitors are fabricated by assembling nano-engineered carbon electrodes in porous templates. The electrodes have textured graphitic surface films with a morphology of interconnected arrays of complex shapes and porosity. The graphitic films act as both electrode and current collector, and when integrated with solid polymer electrolyte function as thin film supercapacitors. The nano-structured electrode morphology and conformal electrolyte packaging provide enough energy and power density for electronic devices in addition to possessing excellent mechanical flexibility and optical transparency.

22 Claims, 14 Drawing Sheets

(51) Int. Cl.
*H01G 11/68* (2013.01)
*H01G 11/48* (2013.01)
*H01G 11/84* (2013.01)

(52) U.S. Cl.
CPC .............. *H01G 11/84* (2013.01); *Y02E 60/13* (2013.01); *Y10T 29/42* (2015.01)

(56) References Cited

U.S. PATENT DOCUMENTS

| | | | |
|---|---|---|---|
| 9,478,363 B2* | 10/2016 | Smithyman | G01N 27/223 |
| 2003/0185741 A1 | 10/2003 | Matyjaszewski et al. | |
| 2008/0003503 A1 | 1/2008 | Kawakami et al. | |
| 2008/0192407 A1 | 8/2008 | Lu et al. | |
| 2010/0261058 A1 | 10/2010 | Lopatin et al. | |
| 2010/0328845 A1 | 12/2010 | Hiralal et al. | |
| 2011/0248401 A1 | 10/2011 | Hellstrom et al. | |
| 2012/0021250 A1 | 1/2012 | Lee et al. | |
| 2012/0027681 A1* | 2/2012 | Jung | B82Y 40/00 424/9.1 |
| 2012/0088159 A1 | 4/2012 | Thomas et al. | |
| 2012/0236467 A1* | 9/2012 | Kang | B82Y 10/00 361/502 |
| 2013/0059232 A1* | 3/2013 | Jung | H01M 4/8825 429/532 |
| 2013/0224633 A1* | 8/2013 | Lee | H01G 11/36 429/530 |

\* cited by examiner

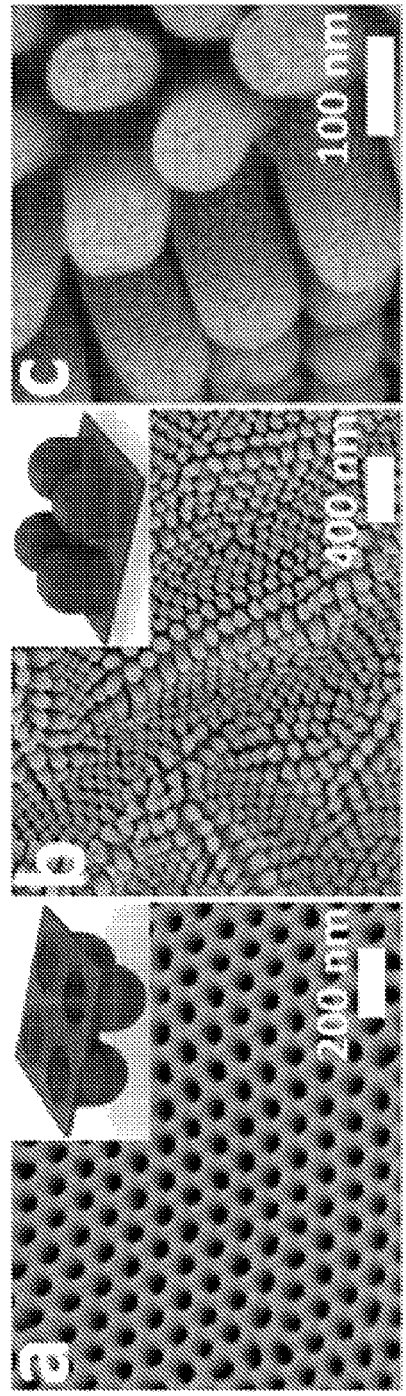
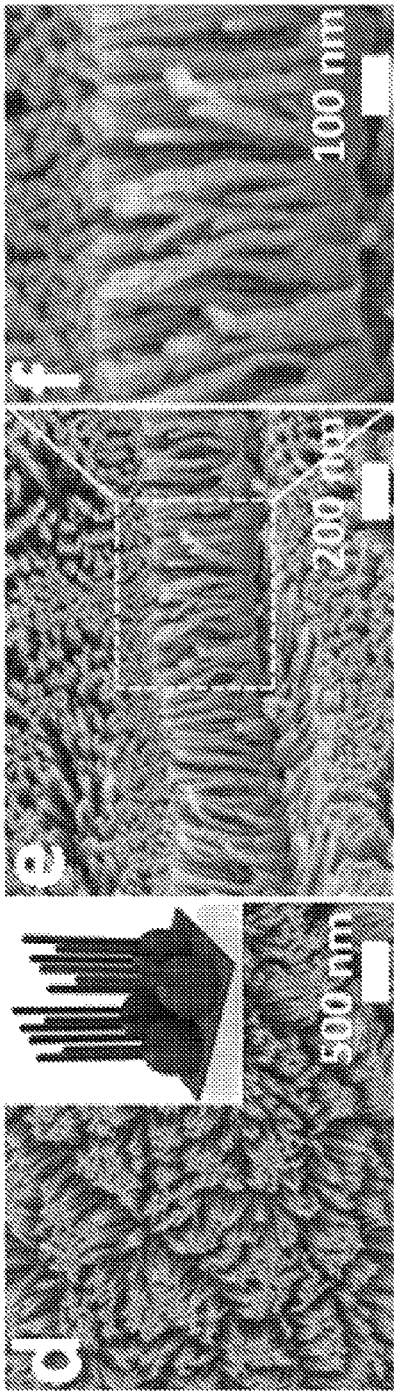
FIG. 1a  FIG. 1b  FIG. 1c
FIG. 1d  FIG. 1e  FIG. 1f

FLEXIBLE AND TRANSPARENT SUPERCAPACITORS AND FABRICATION USING THIN FILM CARBON ELECTRODES WITH CONTROLLED MORPHOLOGIES

CROSS REFERENCE TO RELATED APPLICATIONS

This application claims the priority of U.S. Provisional Application No. 61/623,975, filed Apr. 13, 2013 and entitled "Fabrication of Flexible and Transparent Supercapacitors Using Thin Film Carbon Electrodes With Controlled Morphologies", the whole of which is hereby incorporated by reference.

STATEMENT REGARDING FEDERALLY SPONSORED RESEARCH OR DEVELOPMENT

The invention was developed with financial support from CMMI Grant No. 0927088 from the National Science Foundation and Grant No. W911NF from the Army Research Laboratory/Army Research Office. The U.S. Government has certain rights in the invention.

BACKGROUND

In general, supercapacitors improve storage density through the use of a porous material that increases the specific area of the electrodes. There has been interest in using carbon-based nanomaterials as supercapacitor electrodes due to several advantages of carbon, such as light weight, high electrical conductivity, and electrochemical surface area[1-20]. Activated carbon (AC) has received a lot of attention and has been used in supercapacitor design as a good electrode material due its high surface area. It is currently the material of choice for both low and high voltage applications. However, with AC, the use of binders and conducting agents, the particulate nature of AC, the presence of uncontrolled functional groups, and the ill-defined structure of AC powders hinder the capacitance and result in long-term degradation. Recently, other types of carbon materials such as carbon aerogel, carbon black, carbon nanotubes (CNTs) and graphene have been used for the study of improved supercapacitors. High surface area in these carbon materials is generally characteristic of highly developed nanostructure. Nanomaterials can also have controlled chemical composition and tailored physical architectures down to nanoscale dimensions. They are randomly oriented with respect to the current collectors in a stacked geometry in supercapacitors. In such a case, these carbon materials are unfavorable for electrolyte wetting and rapid ionic motions because the electrolyte ions are often limited from penetrating far inside the graphitic planes.

There would be a large number of interesting new designs for energy storage devices if carbon electrodes could be tailored and engineered in forms that would avoid the problems outlined above.

SUMMARY OF THE INVENTION

The invention provides flexible and transparent supercapacitors using thin carbon films fabricated inside porous templates by chemical vapor deposition. These carbon films contain arrays of periodic and interconnected "carbon nanocup" (CNC) structures composed of few layers of carbon material having a graphitic structure. The CNC-containing carbon films are used as thin-film electrodes for supercapacitor devices of the invention. CNCs have an architecture that is precisely engineered from graphitic carbon deposited within porous templates. The CNCs have much smaller (up to $10^5$ times smaller) length/diameter (L/D) ratios compared to conventional carbon nanotubes, and have a unique nanoscale cup morphology.

Composites made of these CNC films with polymer electrolyte have three remarkable features that render them highly useful in a solid state, thin-film supercapacitor device. First, the CNC film has a high surface area afforded by an array of controlled nanoscale cup structures and highly disordered graphitic layers; this feature is key for the effective permeation of the polymer electrolyte required in supercapacitors. Second, the unique nanoscale structural and morphological features of CNC films enable easy access and fast transport of ions at the electrode/electrolyte interface, resulting in high power capability. Finally, the high current carrying capability, substantial mechanical strength, and small effective electrode thickness (e.g., about 10 nm) allow the supercapacitor material of the invention to be used to build multifunctional, optically transparent, mechanically flexible, and reliable thin-film energy storage devices.

Thus, one aspect of the invention is a supercapacitor device. The device includes a pair of electrodes and an electrolyte material disposed between the electrodes. Each of the electrodes contains a graphitic carbon film which includes an array of nanocup structures. A first face of each carbon film contacts the electrolyte material and a second face of each carbon film is disposed opposite to the first face.

Another aspect of the invention is a method of fabricating the supercapacitor device described above. The method includes the steps of: (a) providing a template containing an array of nanoscale channels; (b) depositing a graphitic carbon film onto the template using a chemical vapor deposition process, whereby a first face of the carbon film contacts the template, and the carbon film contains an array of nanocup structures, each nanocup structure corresponding to a nanoscale channel of the template; (c) depositing a protective layer onto a second face of the carbon film, the protective layer containing a polymer, and the second face of the carbon film disposed opposite the first face of the carbon film; (d) removing the template, leaving an electrode including the carbon film attached to the protective layer; (e) repeating steps (a) through (d) to produce a second electrode; (f) depositing a layer of electrolyte material onto the first face of each of the two electrodes; and (g) joining the two electrodes so that their layers of electrolyte material are combined to form a single layer of electrolyte material, whereby the supercapacitor device is fabricated.

Yet another aspect of the invention is another method of fabricating the supercapacitor device of claim 1, the method including the steps of: (a) providing a template containing an array of nanoscale channels; (b) depositing a graphitic carbon film onto the template using a chemical vapor deposition process, whereby a first face of the carbon film contacts the template, and the carbon film contains an array of nanocup structures, each nanocup structure corresponding to a nanoscale channel of the template; (c) depositing a first protective layer onto a second face of the carbon film, the first protective layer containing a polymer, and the second face of the carbon film disposed opposite the first face of the carbon film; (d) removing the template and replacing it with a second protective layer deposited on the first face of the carbon film; (e) removing the first protective layer and exposing the second face of the carbon film; (f) repeating steps (a) through (e) to produce a second electrode; (g) depositing a layer of electrolyte material onto the second face of each of the two electrodes; (h) joining the two electrodes so that their layers of electrolyte material are combined to form a single layer of electrolyte material, whereby the supercapacitor device is fabricated.

BRIEF DESCRIPTION OF THE DRAWINGS

FIG. 1 shows scanning electron microscope (SEM) images of carbon nanocups (CNCs). SEM images show CNC films in concave (FIG. 1a) and convex (FIGS. 1b, 1c) orientation, as well as a CNC film having branched nanocup morphology (FIGS. 1d-1f). FIG. 1c is a high magnification SEM image of FIG. 1b, showing convex nanocup orientation with 80±10 nm CNC diameter and 140±10 nm CNC length. FIGS. 1e and 1f are cross-sectional views of the material shown in FIG. 1d, showing a branched nanocup film. FIG. 1f is a high magnification image of FIG. 1e, where several short carbon nanotubes (25 nm in diameter and 330±10 nm in length) branch off from the bottom of individual nanocups. Note that the thickness of a CNC film can be controlled by changing carbon deposition time or carbon concentration during the CVD process. The insets show schematic representations of concave, convex, and branched convex nanocup films.

FIG. 4 demonstrates electrochemical properties of branched CNC supercapacitor devices.

FIG. 5 demonstrates the functionality and performance of supercapacitor devices of the invention.

FIG. 8 shows the dependence of capacitance behavior for branched CNC devices.

DETAILED DESCRIPTION OF THE INVENTION

Figure 1G:
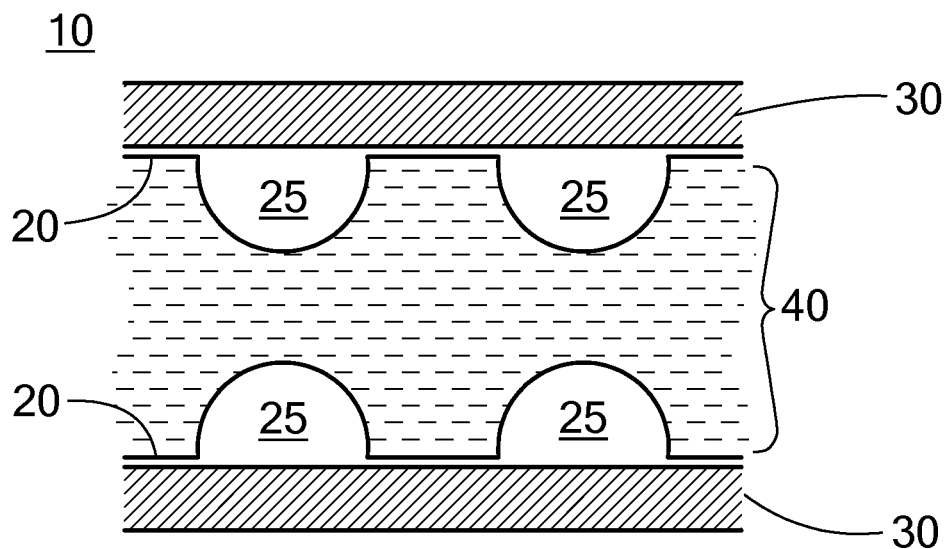
FIG. 1g shows a schematic illustration of a CNC film-based supercapacitor device of the invention in convex orientation.

The invention provides transparent, flexible, thin-film supercapacitor devices with high performance in energy delivery. The devices are assembled using nano-engineered thin graphitic carbon film electrodes with high surface area and complex three-dimensional structure. Unique morphological features of the films enable an excellent conformal filling of polymer electrolyte and maximize active electrochemical surface area, leading to high energy density. The design of the devices allows for mechanically flexible energy storage devices that can be integrated into unique applications that require high form factor and optical transparency, such as rollup displays, wearable devices, and organic solar cell platforms.

The central aspect of the invention is a supercapacitor device containing two electrodes arranged in parallel and having an electrolyte material therebetween. The terms "supercapacitor" and "capacitor" are used interchangeably herein. A supercapacitor has a higher energy storage capacity than a standard film or electrolytic capacitor (up to 10,000 times higher energy density or more). The electrodes contain, or consist of, essentially planar, thin films of graphitic carbon material containing an array of nanosized carbon nanocups (CNCs). In some embodiments the carbon film material serves as both electrode and current collector. Alternatively, the carbon film can serve as an electrode and can be attached to a current collector (e.g., a thin film of conductive metal or a conductive polymer material). In some embodiments the electrolyte layer serves as both electrolyte and separator. In other embodiments, a separator layer can be added in the electrolyte layer, or in place of the electrolyte layer.

The fabrication of a thin carbon film containing an array of CNCs is described, for example, in WO2010/105058A1 and US2012/0027681, which are hereby incorporated by reference. The films have an interconnected, thin, graphitic structure, high specific surface area, and uniform distribution of CNCs integrated into the film in a high density array. The films are deposited in a nanoporous template that confers the nanocup morphology. A preferred template is a nanoporous anodized aluminum oxide (AAO), which contains nanochannels that give the nanocups their form. A nanoporous alumina template can be prepared using a standard electrochemical anodization process[21-22,26]. Carbon films for use in the invention can be engineered to produce three different CNC geometries: concave, convex, and branched convex.

In some embodiments, the transverse diameter of the CNC nanostructure is about 10 nm, about 20 nm, about 30 nm, about 40 nm, about 50 nm, about 60 nm, about 70 nm, about 80 nm, about 90 nm, about 100 nm, about 150 nm, about 200 nm, about 250 nm, about 300 nm, about 400 nm, or about 500 nm. In other embodiments, the transverse diameter is about 10 nm to about 500 nm, about 20 nm to about 250 nm, about 40 nm to about 150 nm, about 10 nm to about 40 nm, about 50 nm to about 100 nm, about 110 nm to about 150 nm, about 160 nm to about 250 nm, or about 260 nm to about 500 nm. The height of the CNC nanostructure above the film is about 20 nm, about 30 nm, about 40 nm, about 50 nm, about 60 nm, about 70 nm, about 80 nm, about 90 nm, about 100 nm, about 150 nm, about 200 nm, about 250 nm, about 300 nm, about 400 nm, about 500 nm, about 600 nm, about 700 nm, about 800 nm, about 900 nm, or about 1,000 nm. In yet other embodiments, the height of the nanostructure is about 20 nm to about 1,000 nm, about 40 nm to about 500 nm, about 60 nm to about 250 nm, about 80 nm to about 200 nm, about 20 nm to about 40 nm, about 50 nm to about 80 nm, about 100 nm to about 500 nm, or about 600 nm to about 1,000 nm. In some embodiments, the heights and/or transverse diameters of the nanostructures are uniform. In certain embodiments, about 10%, about 20%, about 30%, about 40%, about 50%, about 60%, about 70%, about 80%, about 90% or 100% of the nanostructures have essentially the same height and/or transverse diameter. In other embodiments, about 10% to about 20%, about 30% to about 40%, about 50% to about 60%, about 70% to about 80%, or about 90% to about 100% of the nanostructures have the same height and/or transverse diameter. In some embodiments, the lateral wall of the CNCs and/or the graphitic carbon film has a thickness of about 1 nm, about 2 nm, about 3 nm, about 4 nm, about 5 nm, about 6 nm, about 7 nm, about 8 nm, about 9 nm, about 10 nm, about 15 nm, about 20 nm, about 25 nm, about 30 nm, about 35 nm, about 40 nm, about 50 nm, about 60 nm, about 70 nm, about 80 nm, about 90 nm, about 100 nm, about 150 nm, about 200 nm, or greater. In yet other embodiments, the lateral wall has a thickness of about 1 nm to about 200 nm, about 10 nm to about 100 nm, about 20 nm to about 50 nm, about 1 nm to about 5 nm, about 6 nm to about 10 nm, about 15 nm to about 50 nm, about 60 nm to about 100 nm, about 100 nm to about 150 nm, or about 150 nm to about 200 nm. A graphitic carbon film as used in the invention has an array of CNCs. In some embodiments, the array comprises about 2, about 5, about 10, about 20, about 30, about 40, about 50, about 60, about 70, about 80, about 90, about 100, about 200, about 400, about 500, about 1,000, or more nanocups. In other embodiments, the array comprises about 2 to about 1,000, about 100 to about 1,000, about 500 to about 10,000, about 1,000 to about 10,000, about 100 to about 500, about 500 to about 1,000, about 1,000 to about 5,000, or about 5,000 to about 10,000 or more nanocups. The CNCs in the array can be ordered according to a regular pattern or can be randomly distributed across the film.

To obtain concave and convex nanocups, a two-step anodization process is performed: the first step (first anodization) creates an array of nanochannels (also referred to herein as "nanopores" or "nanoscale channels"; "nanoscale" refers to an object having dimensions in the range from 1 nm to 1000 nm), and the second step (etching) enlarges the pore diameter. For example, anodization can be performed at about 45 V in 3% oxalic acid ($C_2H_4O_2$) solution for about 20 seconds, which results in the formation of short nanochannels. Longer anodization times will produce longer nanochannels. Then, AAO templates from the first anodization step are soaked in a 5% phosphoric acid solution for 1 hour at room temperature to widen the nanochannels.

In general, for fabricating a template, an aluminum sheet is prepared. The aluminum sheet can be a thin layer of aluminum, such as aluminum foil. Although aluminum is preferred, any metal that can be processed by electrochemical anodization can be used. The aluminum sheet is subjected to electrochemical anodization. In one exemplary method, aluminum sheet is subjected to anodization at 40-45V for 4 hours in 3% to 5% oxalic acid ($C_2H_4O_2$) solution at room temperature. The resulting structure includes an array of nanochannels within an aluminum (aluminum oxide) sheet. The nanochannels are defined by a layer of aluminum oxide that forms lateral walls and rounded bottoms within the aluminum sheet. Next, the aluminum oxide layer is removed from the aluminum sheet using known methods, such as, e.g., by contacting the template structure with an acid solution (e.g., a solution of 5% phosphoric ($H_3PO_4$) and 5% chromic ($H_2CrO_4$) acid). Sulfuric acid also could be used. Optionally, the resulting structure can then be subjected to a re-anodization process. In one exemplary method, the template is subjected to re-anodization for about 20 seconds to about 40 seconds. The final template contains nanochannels within the aluminum sheet. The nanochannels are defined by lateral walls and rounded bottoms, and are open at the top ends, opposite rounded bottoms.

In order to produce branched convex nanocups, a third step (second anodization) is added to the two-step procedure outlined above. The second anodization is carried out for about 5 minutes at about 25 V in 3% oxalic acid solution. This results in the formation of one or more secondary nanochannels at the bottom of the first set of (enlarged) nanochannels. Some of the secondary channels can be branched.

A thin graphitic film containing low aspect-ratio CNCs can be synthesized by using a chemical vapor deposition (CVD) process, e.g., using 630° C. and 10% acetylene gas as a carbon source (the remainder of the gas is argon). Devices using convex or branched convex nanocup geometry (i.e., the side facing the electrolyte is convex or branched convex) are formed by carbon deposition into the nanochannels of the template, followed by transfer of the carbon film onto a PDMS film (support layer) deposited as a protective layer onto the side of the film opposite the electrolyte. The support layer can have any thickness desired for the chosen application. However, in certain embodiments, the thickness of the support layer is from about 5 nm to about 200 nm, or from about 5 nm to about 1000 nm, to about 10000 nm, to about 100000 nm, or to about 1000000 nm. However, excessive thickness of the support layer can hinder both flexibility and transparency. The carbon film (with PDMS backing if present) can be released or separated from that template, for example, by dissolving the AAO template in a solution containing 3.4 g copper chloride, 100 mL hydrochloric acid, and 100 mL deionized water. The detached film is transparent and flexible, and can be employed directly as a graphitic carbon electrode. For devices using the concave nanocup geometry, the gel electrolyte is first placed between two CNC films with attached AAO templates (facing away from the electrolyte) followed by dissolving the templates. In this situation, both sides of the film are coated by PDMS in order to facilitate the handling.

An electrolyte material is then added to a pair of CNC film electrodes, which are then assembled to form a capacitor device. The electrolyte can be any solid electrolyte, such as those known in fuel cell and battery technology. Fast ion conductors with conductivity for $H^+$ are suitable, for example. Preferably, the electrolyte material is a gel when applied to the electrodes and when the supercapacitor device is assembled. Then, water is removed from the electrolyte gel by evaporation, which can be accelerated by heating or use of a dessicant, leaving a solid electrolyte material in the final device, which is thus a "solid state" supercapacitor device. For example, a gel electrolyte can be prepared by mixing polyvinyl alcohol (PVA) powder with water (e.g., 1 g of PVA/10 mL of $H_2O$) and adding concentrated $H_3PO_4$ (e.g., 0.8 g). The electrodes can be coated with the PVA/$H_3PO_4$ electrolyte by spin coating. A coating of about 8 μm to about 20 μm thickness (e.g., about 12 μm thickness) can be used. PVA acts as a host for ionic conduction. The ion source comes from the $H_3PO_4$ which acts as a proton donor material. Upon evaporation of water from the electrolyte material, the electrolyte solidifies. This polymer electrolyte shows very stable performance in the operating range of 1V in the CNC-based supercapacitors of the invention.

FIGS. 1a and 1b-c show scanning electron microscopy (SEM) images of top (concave) and bottom (convex) surfaces of as-synthesized CNC films. The films were made using AAO template channels of 80±10 nm diameter and 140±10 nm length. By connecting the highly dense and ordered arrays of nanocups with a continuous layer of graphitic material, large surface area, porous, nanostructured films were achieved which proved to be ideal for use as energy storage electrodes. To further increase the surface area of the CNC films, a branched nanocup architecture was produced, with each nanocup having a number of short nanotubes (25 nm in diameter and 330±10 nm in length) attached to the bottoms of the CNCs. Such films were fabricated using a multistep anodization process to produce the template, followed by a chemical vapor deposition (CVD) method[21] to produce the graphitic material in the template (see, e.g., FIGS. 1d-1f). The nanopore dimension in the anodic aluminum oxide (AAO) template, and therefore the overall structure (e.g., length, diameter, and L/D ratio or aspect ratio) of the CNC, can be precisely controlled. Similarly, the CVD conditions can be controlled so as to establish a desired wall thickness of the CNC. These are important factors to determine capacitor behavior, mechanical stability, and optical properties of devices using the CNC films of the invention. Calculations reveal that a branched convex CNC film possesses 2.3 times higher surface area exposed to the electrolyte than that of a normal convex CNC film (see Example 1 for the surface area calculation).

The length of branched carbon nanotubes can be optimized to obtain optical transparency as well as maximized electrochemically active interface between electrodes and polymer electrolyte. These features should be balanced according to the desired use. If transparency is not desired, longer aspect ratio CNC could be used to provide more surface area and higher specific capacitance. If transparency is desired, then a shorter aspect ratio can be used. The length of unbranched or branched nanotubes is controlled at least in part by the length of the nanochannels (primary or secondary nanochannels) of the template. In certain embodiments, the length of the nanochannel is about 20 nm, about 30 nm, about 40 nm, about 50 nm, about 60 nm, about 70 nm, about 80 nm, about 90 nm, about 100 nm, about 150 nm, about 200 nm, about 250 nm, about 300 nm, about 400 nm, about 500 nm, about 600 nm, about 700 nm, about 800 nm, about 900 nm, or about 1,000 nm. In yet other embodiments, the length of the nanochannel is about 20 nm to about 1,000 nm, about 40 nm to about 500 nm, about 60 nm to about 250 nm, about 80 nm to about 200 nm, about 20 nm to about 40 nm, about 50 nm to about 80 nm, about 100 nm to about 500 nm, or about 600 nm to about 1,000 nm.

Another feature of the CNC materials of the invention is that the innermost layer of the concave nanocup (e.g., the surface shown in FIG. 1a) has a relatively well-ordered graphitic structure, while the outermost layer, which is the surface of the convex part (e.g., the surface shown in FIGS. 1b-f), is very defective[22]. When used as a supercapacitor electrode, these defects can act as reactive sites, providing effective charge transfer and good electrode-electrolyte interfaces that minimize the internal resistance of supercapacitor devices. The measured surface electrical conductivity of the CNC film was 117 S/m, which is higher than typical activated carbon electrodes (~30 S/m)[23] used in supercapacitors.

Figure 1H:
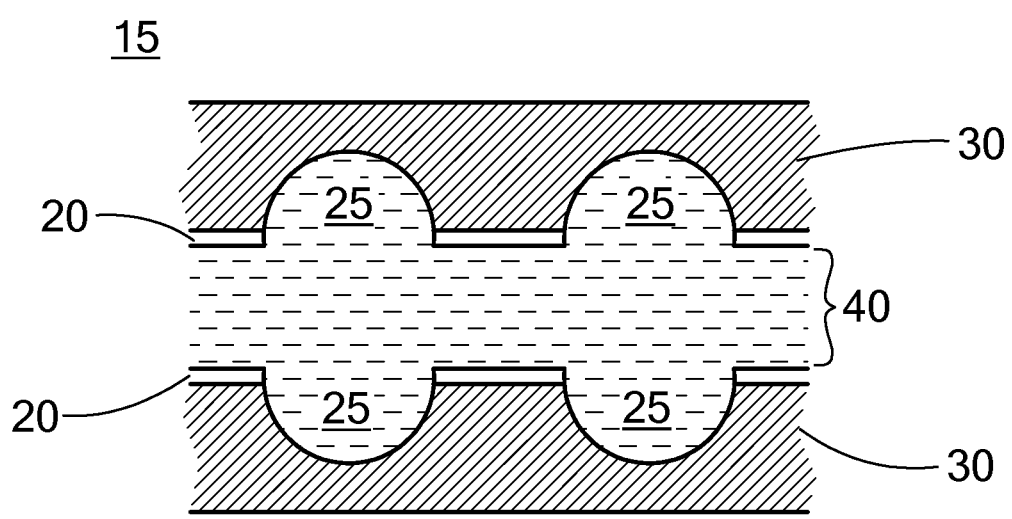
FIG. 1h shows a schematic illustration of a CNC film-based supercapacitor device of the invention in concave orientation.

FIGS. 1g-1h show cross-sectional representations of supercapacitor devices of the invention. Device 10 shown in FIG. 1g has "convex" orientation; i.e., CNC 25 in CNC film 20 are oriented with their convex faces oriented towards the center of the device and contacting electrolyte material 40. The opposing face of the CNC film is in contact with support layers 30. Similarly, device 15 shown in FIG. 1h has "concave" orientation, in which CNC 25 in CNC film 20 are oriented with their concave faces towards the center of the device and contacting electrolyte material 40. The opposing face of the CNC film is again in contact with support layers 30.

Figure 2A:
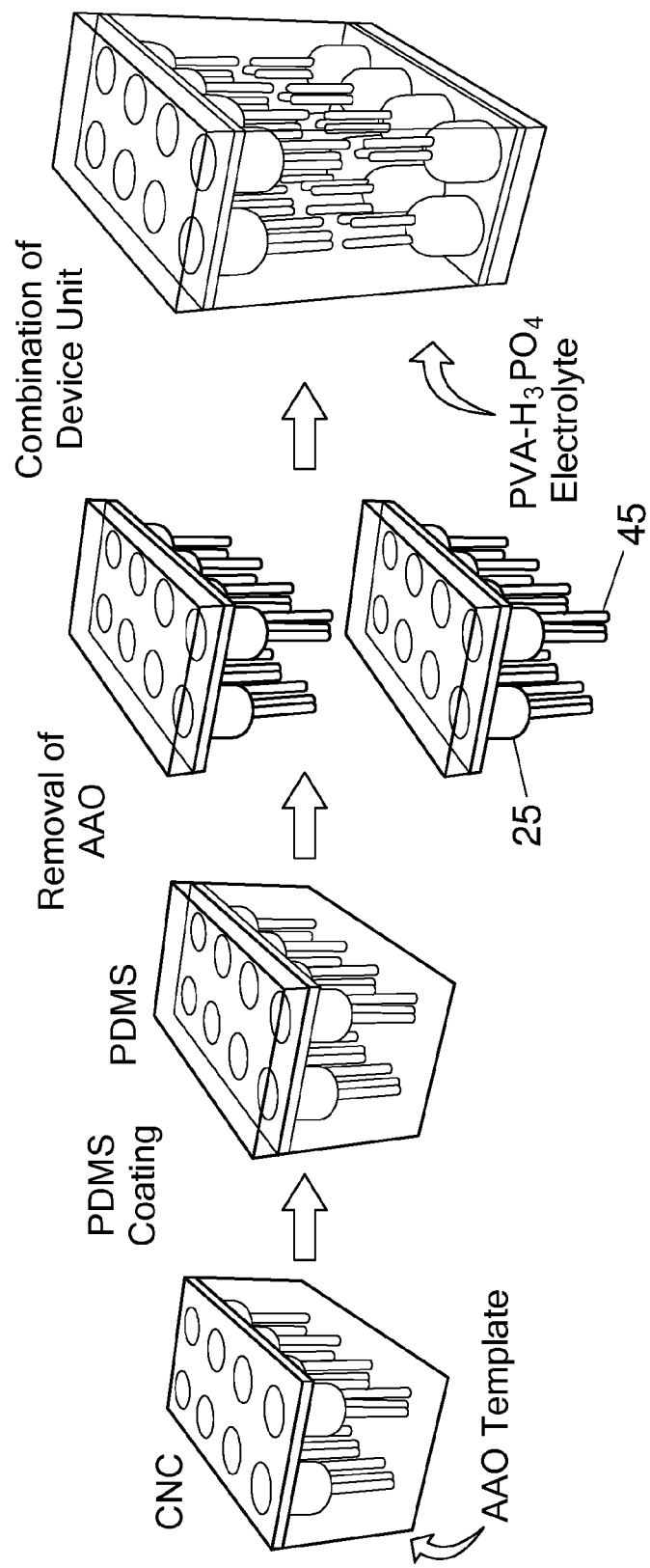
FIG. 2a illustrates how first the CNC films are transferred to PDMS and released by dissolving the AAO templates. Then, the gel electrolyte (serving as electrolyte separator) is sandwiched between two CNC electrodes (each of which serves as both electrode and current collector). The gel electrolyte has 12 μm thickness and solidifies after the evaporation of water. Photographs demonstrate the transparent (FIG. 2b) and flexible (FIG. 2c) natures of the CNC supercapacitor devices.
Figures 2B, 2C:
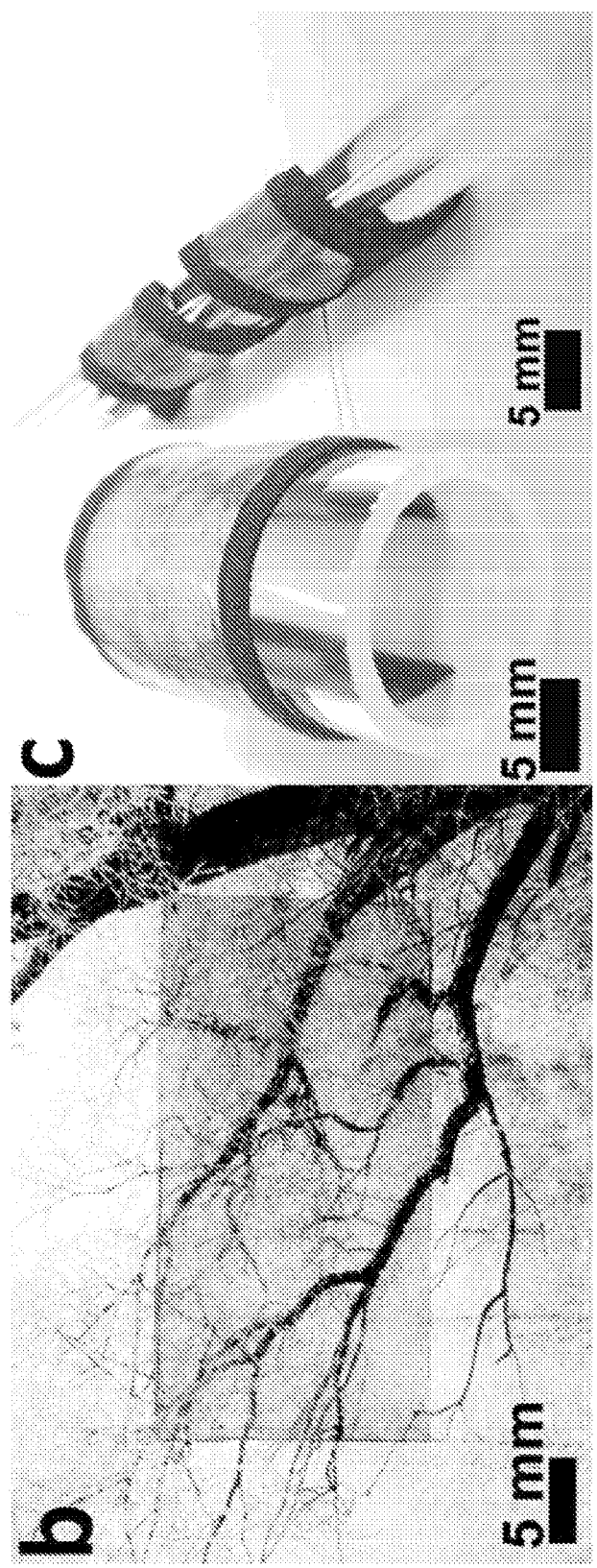
FIG. 2 shows a schematic representation of a process for fabricating a branched CNC-based supercapacitor and optical images of the supercapacitor.

A flexible and transparent thin-film supercapacitor device was fabricated by impregnating two highly porous CNC electrodes (an anode and a cathode) with transparent polymer electrolyte films. FIG. 2a shows a schematic illustration of a fabrication process for CNC-polymer electrolyte thin films containing nanocups 25 having one or more branched or unbranched carbon nanotubes 45 extending from the nanocup structures into the electrolyte material. Optical images of resulting supercapacitor devices are shown in FIGS. 2b and 2c. As shown in FIG. 2a, the nanocup films are transferred to a polydimethylsiloxane (PDMS) film and released from the AAO template by dissolving the template in a solution of copper chloride and hydrochloric acid to produce transparent and flexible graphitic carbon electrodes.

Figure 3:
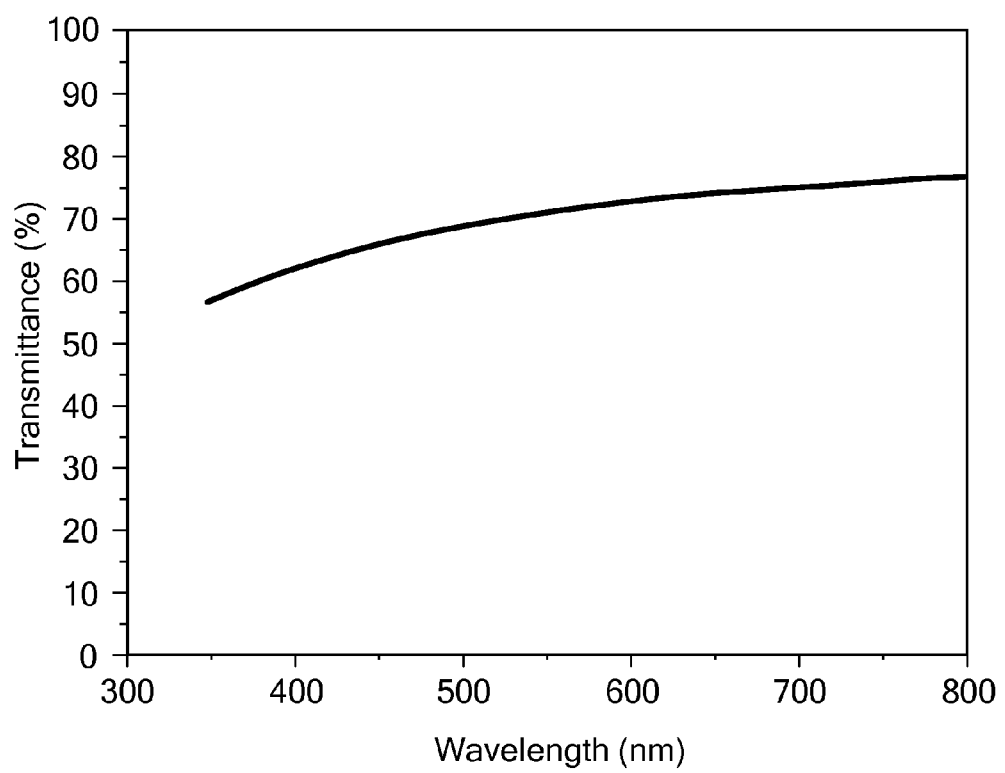
FIG. 3 shows the transmittance of a CNC film of the invention as a function of the wavelength of light. Transmission was 71% at 500 nm.

The CNC films can be utilized as dual function layers in supercapacitor devices. For each CNC film, an inner graphitic layer exposed to the electrolyte acts as an active electrode, and an outer graphitic layer works as a current collector. The fact that ultra-thin and organized arrays of nanostructured graphitic film can be used both as electrodes and as current collectors enables the design and creation of mechanically flexible and optically transparent supercapacitor film in a scalable and simple manner. For the ionic electrolyte/separator, a gel electrolyte such as polyvinyl alcohol-phosphoric acid (PVA-$H_3PO_4$) can be sandwiched between two separated CNC electrode films. The PVA-$H_3PO_4$ polymer solution can be poured over the CNC film and the film spin-coated, e.g., at 500 rpm, to obtain an effective electrolyte thickness (e.g., about 12 μm). In certain embodiments, CNC films of the invention are transparent, e.g., with a transmittance of about 71% at 550 nm wavelength (see FIG. 3). Consequently, the fabricated solid-state thin film CNC supercapacitor devices made therefrom are optically transparent (FIG. 2b). They are also mechanically flexible (FIG. 2c).

Figure 4A:
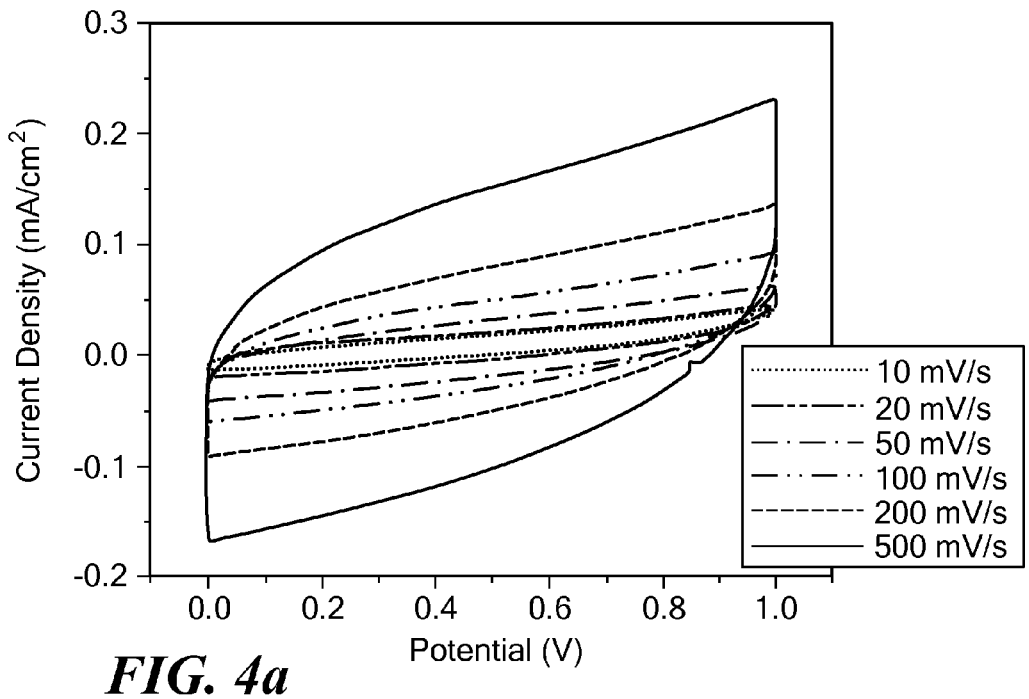
FIG. 4a shows cyclic voltammetry (CV) measurements using 10-500 mVs$^{-1}$ scan rates. The current density increases gradually from a scan rate of 10 mV/s to 500 mV/s (the order of the curves shown is 10, 20, 50, 100, 200, and 500 mV/s from bottom to top in the upper curve).
Figure 6A:
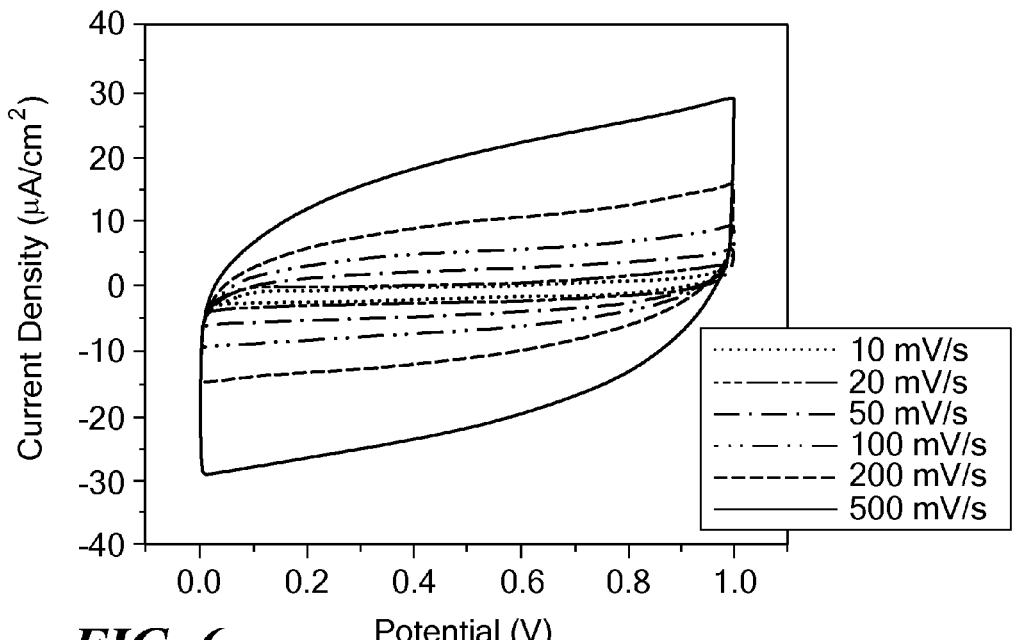
FIG. 6 shows the electrochemical properties of concave and convex CNC supercapacitor devices. The cyclic voltammetry, charge/discharge curves and normalized capacitance as a function of cycle-number (1200) and w/wo the mechanical deformation (45° bending) for the concave (FIGS. 6a-6c) and convex (FIGS. 6d-6f) CNC devices. The CV curves (FIGS. 6a and 6d) were measured between 0 and 1V with various scan rates in the ranges of 10-500 mVs-1 and display nearly rectangular shape even at very high scan rates. The current density increases gradually from a scan rate of 10 mV/s to 500 mV/s (the order of the curves shown is 10, 20, 50, 100, 200, and 500 mV/s from bottom to top in the upper curve). The CD curves (FIGS. 6b and 6e) were obtained at a constant current density of 4.2 μA cm$^{-2}$ for the concave CNCs and 5 μA cm$^{-2}$ for the convex CNCs. The capacitances by the geometrical area calculated from CD curves were 78 and 132 μf cm$^{-2}$ for concave and convex CNC supercapacitors, respectively. The normalized capacitance as a function of cycle-number is shown in FIGS. 6c and 6f. The supercapacitor devices show almost no degradation in performance for 1200 cycles.
Figure 6B:
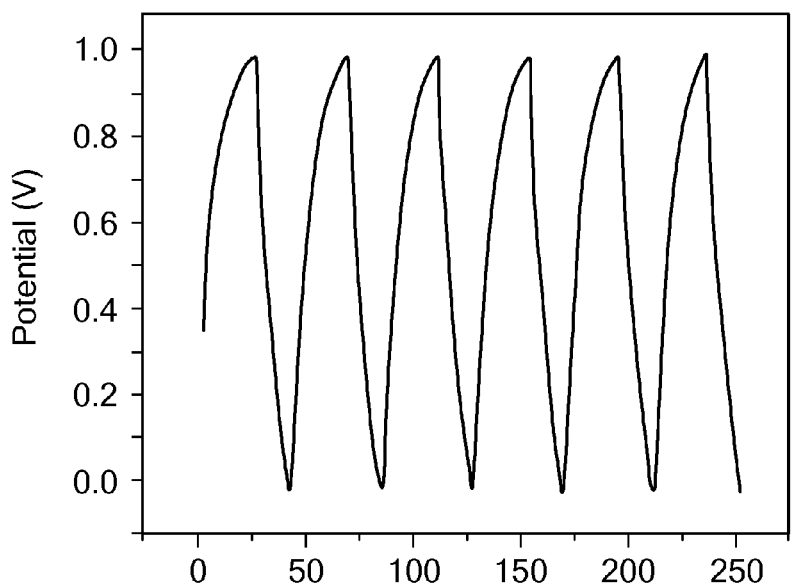
Figure 6C:
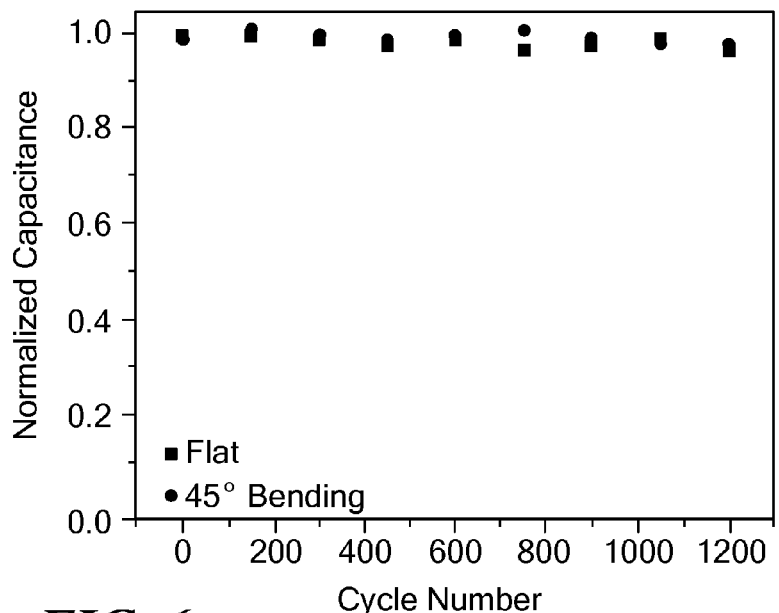
Figure 6D:
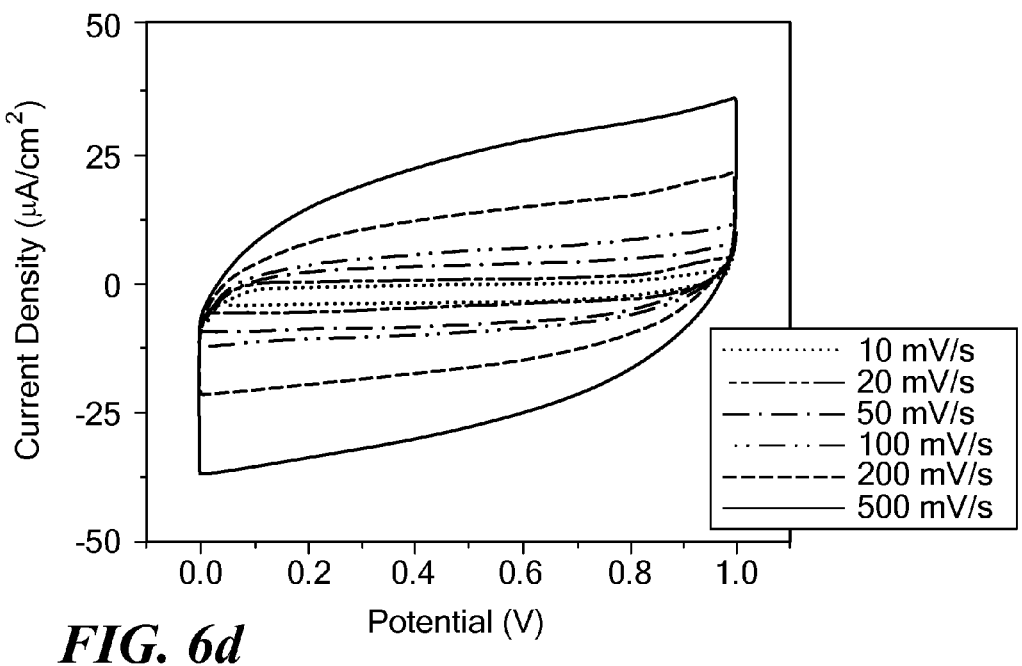
Figure 6E:
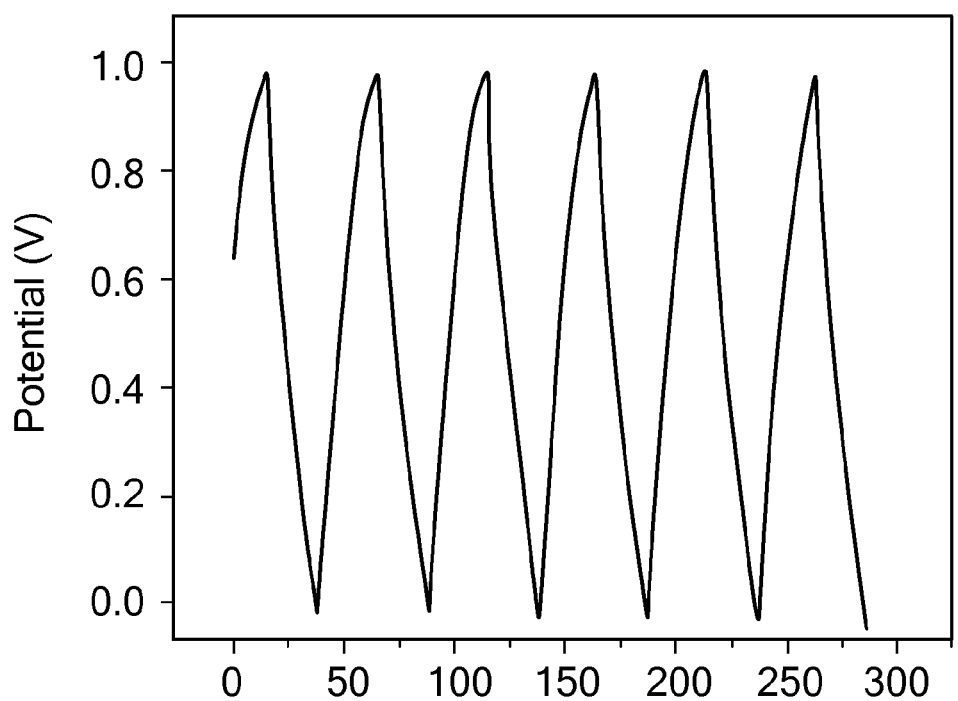
Figure 6F:
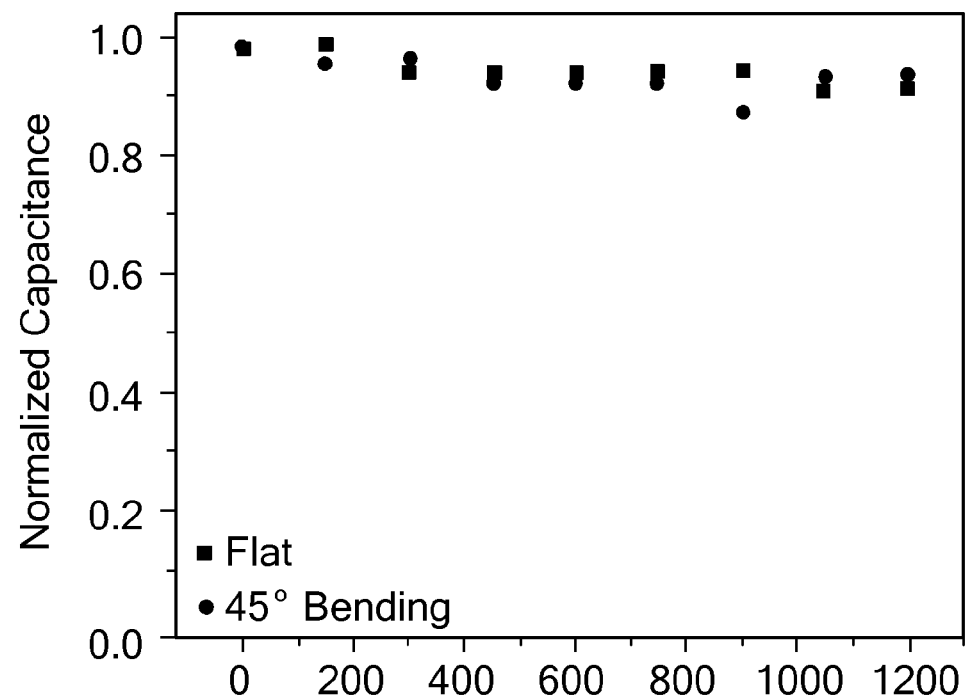

The CNC films described herein can be installed in a capacitor device using any of three possible orientations, defined according to the geometry of the surface (concave, convex (also referred to as "unbranched convex"), or branched convex) that faces toward the electrolyte. Cyclic voltammetry (CV) was performed to evaluate the capacitance of all three different types of CNC electrode-based solid state supercapacitors (concave, convex, and branched convex). All CV curves showed a very rapid current response on the voltage reversal at each end potential and straight rectangular shapes representing a very small equivalent series resistance of electrodes and faster ionic diffusion in the electrolyte film. The CV curves of CNC devices were measured with various scan rates in the range of 10-500 mVs$^{-1}$. Especially when a branched CNC electrode (branched convex) is used (FIG. 4a), nearly rectangular shaped CV curves were obtained, even at very high scan rates, demonstrating high performance capacitor devices (for concave and convex CNC devices, see FIGS. 6a and 6d). Galvanostatic charge/discharge (CD) measurements were also conducted to evaluate the normalized capacitance and internal resistance of the branched convex CNC supercapacitor device (for concave and convex CNC devices, see FIGS. 6b and 6e). The E-t responses of the charge process showed a triangular shape and mirror image with corresponding discharge counterparts, confirming the formation of an efficient capacitor and excellent charge propagation across the two electrodes.

The capacitances scaled by the geometrical area calculated from the CD curves were 78, 132, and 409 μFcm$^{-2}$ for the concave, convex, and branched CNC supercapacitors, respectively (see Example 2 for the capacitance calculation). The areal capacitances were calculated, and not the gravimetric capacitance, due to the ambiguities in mass determination of the CNC films. Though the specific surface area of the convex CNC is 1.25 times higher than that of the concave CNC, the convex CNC device shows 1.7 times higher capacitance than the concave CNC device because of its more open surface morphology and electrochemically active sites formed on the surface of AAO templates[22]. For the branched convex type supercapacitor device, where electrochemically active surface is maximized, the measured specific capacity was 3-5 times higher than for regular (unbranched) CNC capacitor devices and 6 times higher than what has been reported for a single-layered graphene device[18]. Also the volumetric capacitance of the branched convex type supercapacitor (0.33 F/cm$^{-3}$) is only 1.36 times smaller, while providing high transparency, than what has been reported for laser-scribed graphene electrochemical capacitors using the same electrolyte[20]. From the voltage versus time profile, the coulombic efficiency, η, was calculated using a ratio of the times for galvanostatic discharging and charging. An ideal capacitor gives 100% efficiency and has mirror inverse V shape from the galvanostatic CD curve. The columbic efficiency for the CNC supercapacitor was 86%.

Figure 4B:
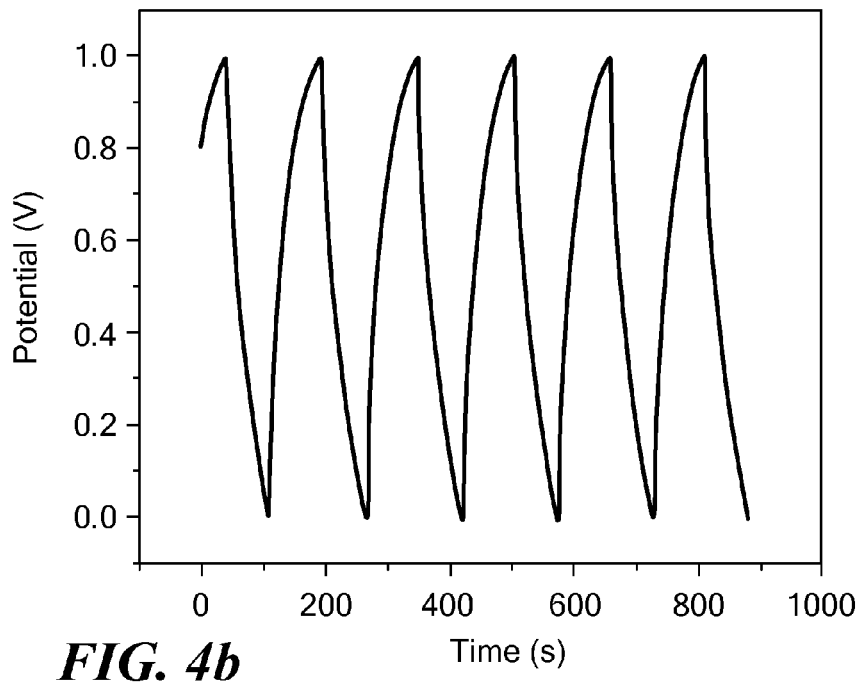
FIG. 4b shows galvanostatic charge/discharge (CD) results measured at a constant current density of 5 μAcm$^{-2}$. The capacitance scaled by the geometrical area calculated from CD curves was 409 μFcm$^{-2}$.
Figure 4C:
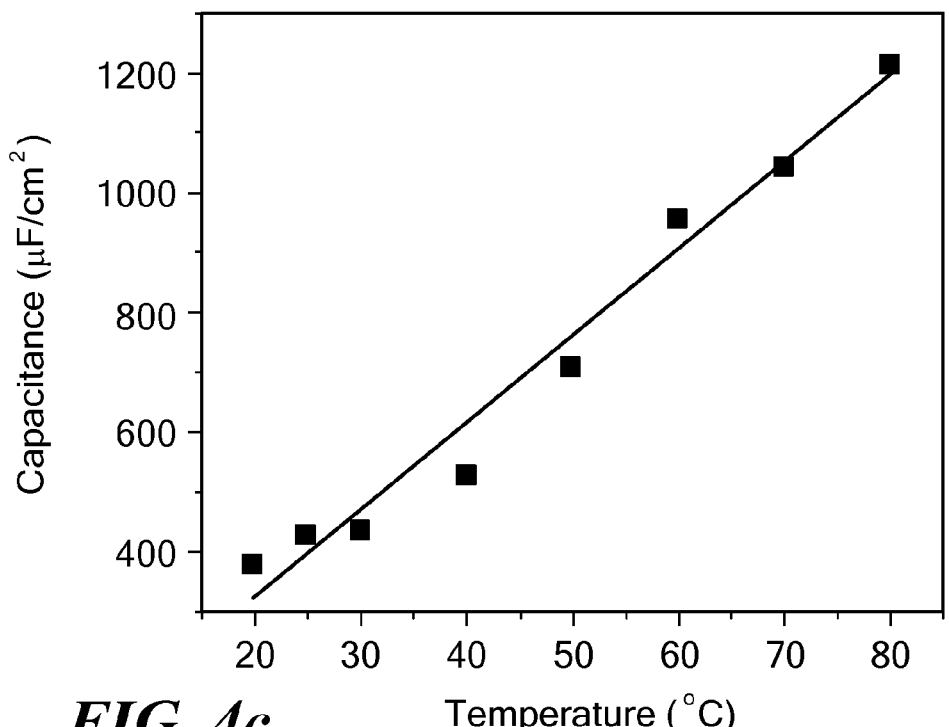
FIG. 4c shows the capacitance change as a function of temperature at 20° C. to 80° C.

The temperature effects on capacitance and charge-discharge behaviors in CNC devices were also explored. As shown in FIG. 4c, about three times higher capacitance (1220 μFcm$^{-2}$) was observed at 80° C. compared to the capacitance measured at room temperature. The increase in capacitance may be partly due to the molecular alignment of PVA-$H_3PO_4$ chains and the excitation of charge carriers present on the imperfect sites of the CNC electrode surface with a moderate temperature increase[16].

Figure 4D:
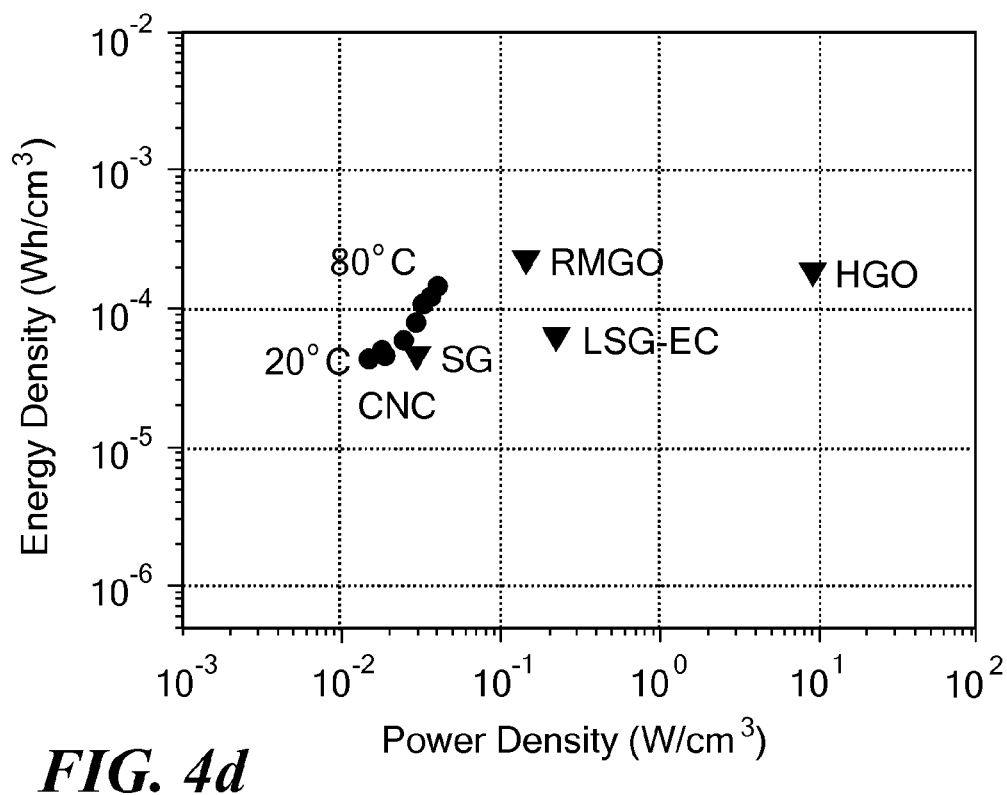
In FIG. 4d CNC devices of the invention at indicated temperatures are compared with various prior art energy storing devices in a Ragone plot, which plots the values of energy density vs. power density. The prior art devices are: SG, single layer graphene[18]; RMGO, reduced multilayer graphene oxide[18]; HGO, hydrated graphitic oxide[19]; and LSG-EC, laser-scribed graphene electrochemical capacitor[20].

To evaluate the energy storage performance of the branched CNC device, energy density was plotted versus power density (Ragone chart)[24-25]. The results are shown in FIG. 4d. Using the internal resistance values and capacitances, energy and peak power densities for CNC supercapacitors were calculated (see the methods section). The results were compared with literature values for different thin film energy storage devices designed for flexible electronic applications. The volumetric peak power (this includes two CNC films and the polymer electrolyte) and energy densities of the branched CNC-based supercapacitors were 19 mW/cm$^3$ and 47 μWh/cm$^3$ respectively. These values are similar to those of a single layer graphene-based solid state supercapacitor[18] and a laser-scribed graphene electrochemical capacitor[20] using the same electrolyte in energy density while offering high mechanical flexibility and optical transparency. In addition, the branched CNC-based supercapacitor exhibits an increase of energy density of up to 3.1 times higher at 80° C. and has a similar energy density value to reduced multilayer graphene oxide and hydrated graphitic oxide[19]. This remarkable thin film capacitor behavior can be attributed to the well-textured nanoscale features on the electrode, the significantly increased surface area in the more complex branched CNC films, the excellent conformal filling of polymer electrolyte, and the maximized active electrochemical surface area. Further, the fully interconnected graphitic structures of CNC films are believed to facilitate the charge transfer during charge/discharge processes, leading to the higher power density.

Figure 5A:
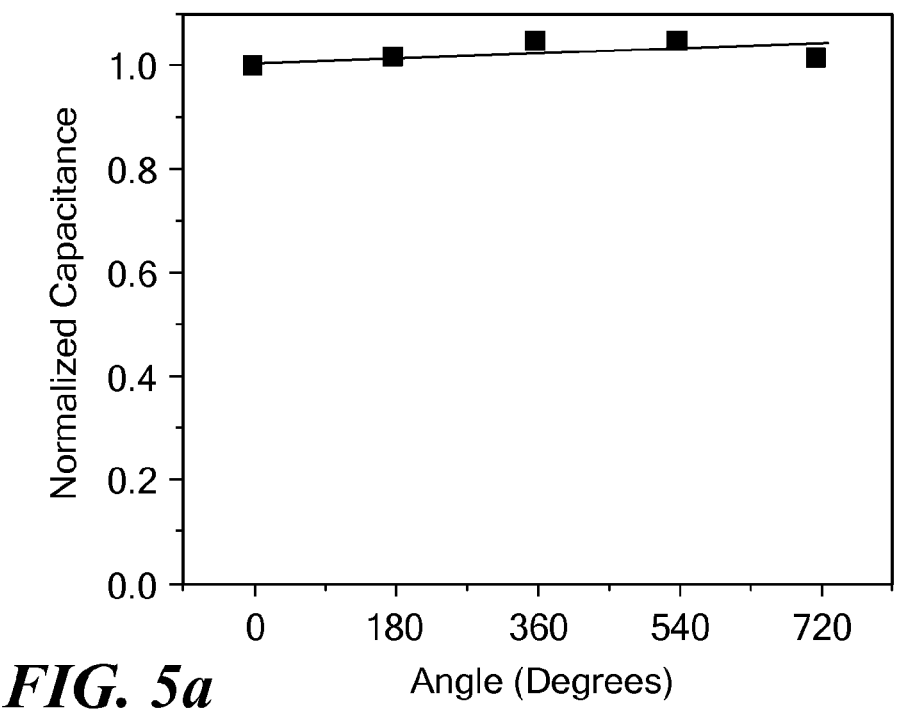
FIG. 5a shows normalized capacitance as the number of wrappings of CNC film (0 to 720°).
Figure 7A:
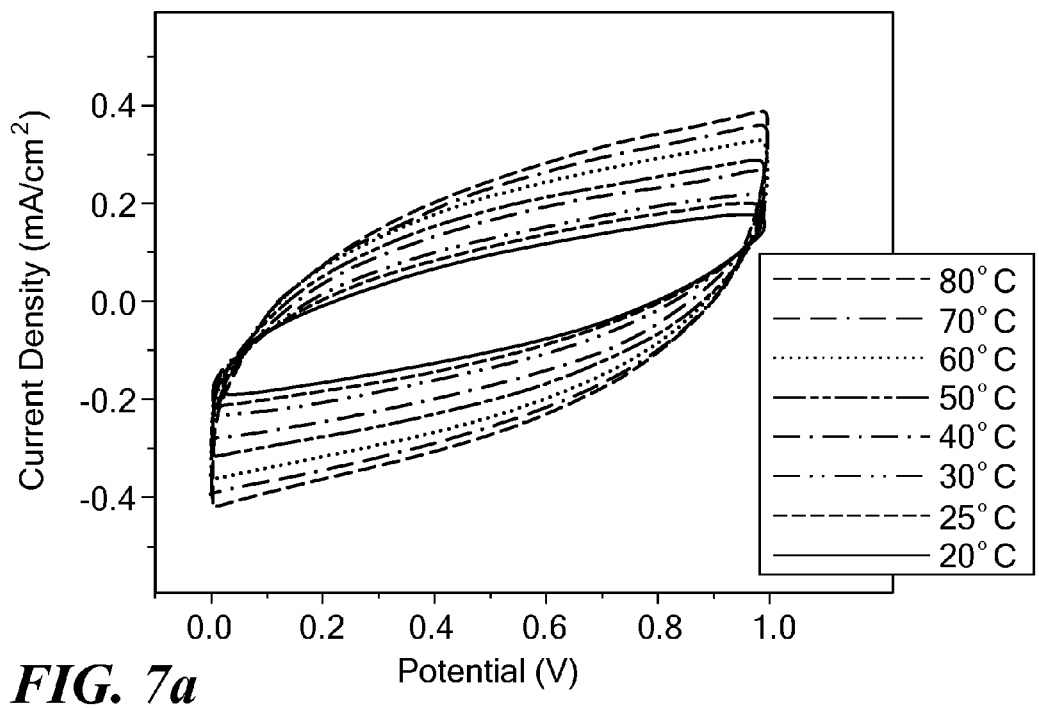
FIG. 7 shows the temperature dependence of capacitance behavior for branched CNC supercapacitor devices. The current-voltage curves are shown in FIG. 7a (the capacitance increases gradually from 20 to 80° C. (order of the curves shown is 20, 25, 30, 40, 50, 60, 70, and 80° C. from bottom to top in the upper curve). The charge-discharge curves as a function of time are shown in FIG. 7b. The charge-discharge times increase gradually from 20 to 80° C. (order of the curves shown is 20, 25, 30, 40, 50, 60, 70, and 80° C. from left to right).
Figure 7B:
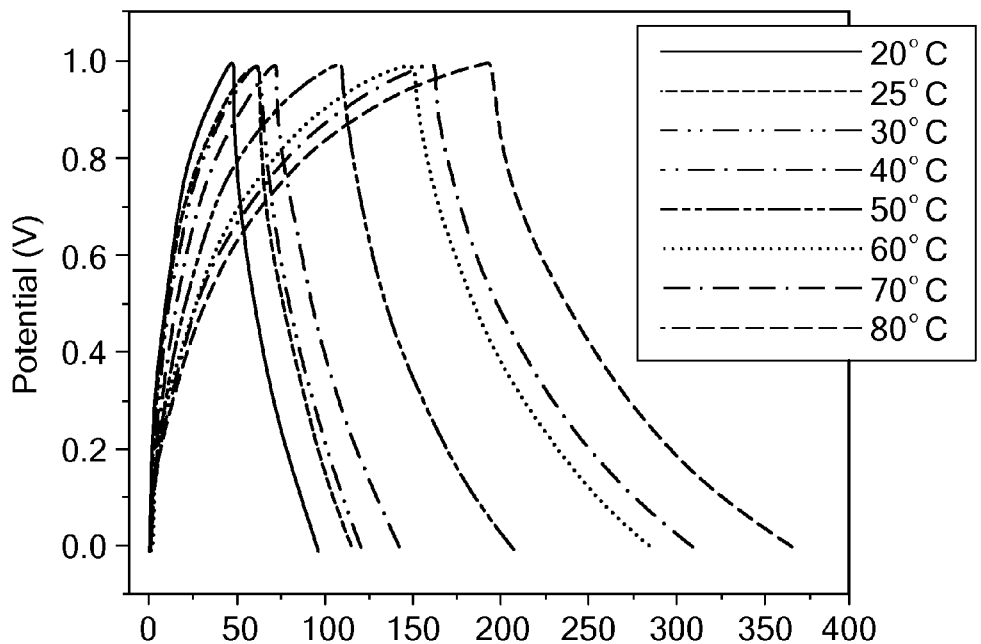

In order to evaluate the potential of CNC-based supercapacitors for use as mechanically flexible energy storage devices, a CNC-based device was placed under various mechanical deformations, and its performance was analyzed. The capacitance and other electrochemical properties changes were determined according to the number of helical wrappings of the CNC capacitor film (3.5 cm by 0.5 cm) around a glass tube (0.5 cm diameter). The results are shown in FIG. 5a and FIG. 7, and showed that CNC capacitor devices retain their superior capacitance, CV and CD properties even after being helically rolled up to 720°. This excellent mechanical flexibility and integrity is believed to be due to the effective conformal filling of polymer electrolyte into the highly organized graphitic nanostructured film.

Figure 5B:
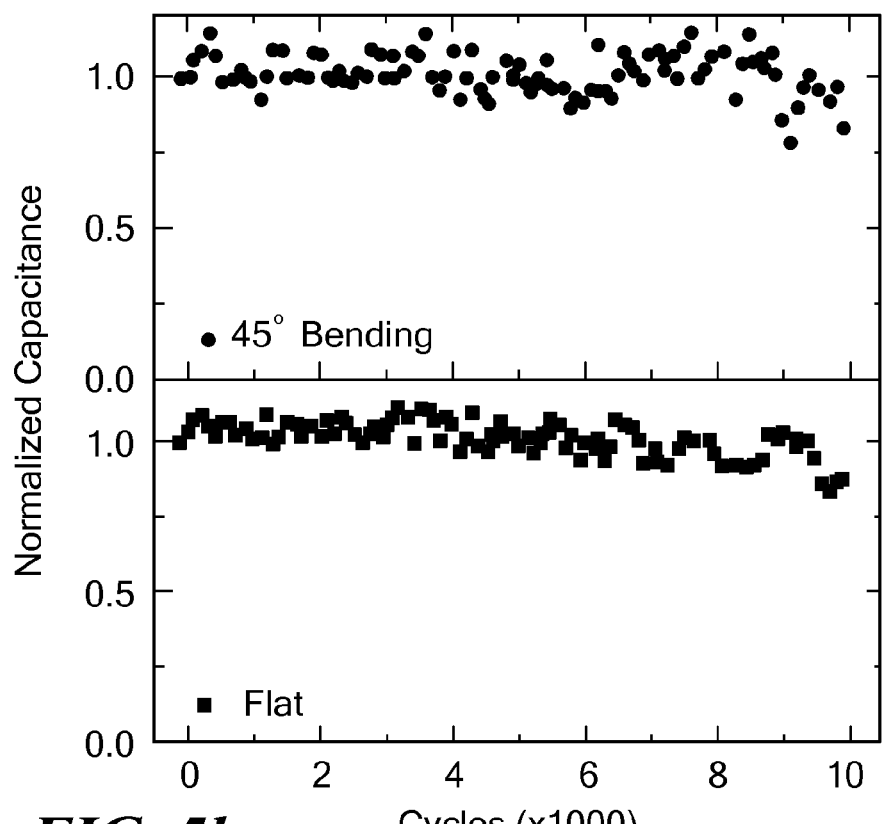
FIG. 5b shows normalized capacitance as a function of cycle-number (up to 10,000) and with or without mechanical deformation (flat vs. 45° bending).

The cycle life of CNC supercapacitors was estimated from a large number of charge-discharge cycles at constant current, measured with and without mechanical deformation. The normalized capacitance as a function of cycle-number is shown in the FIG. 5b. Even under mechanical stress (45° bending), the supercapacitor devices showed a long life cycle stability, with >84% of the initial capacitance remaining after 10,000 cycles, indicating that the performance is not limited by parasitic chemical reactions or mechanical breakdown due to swelling of the electrode or mechanical strain during charging-discharging.

Figure 5D:
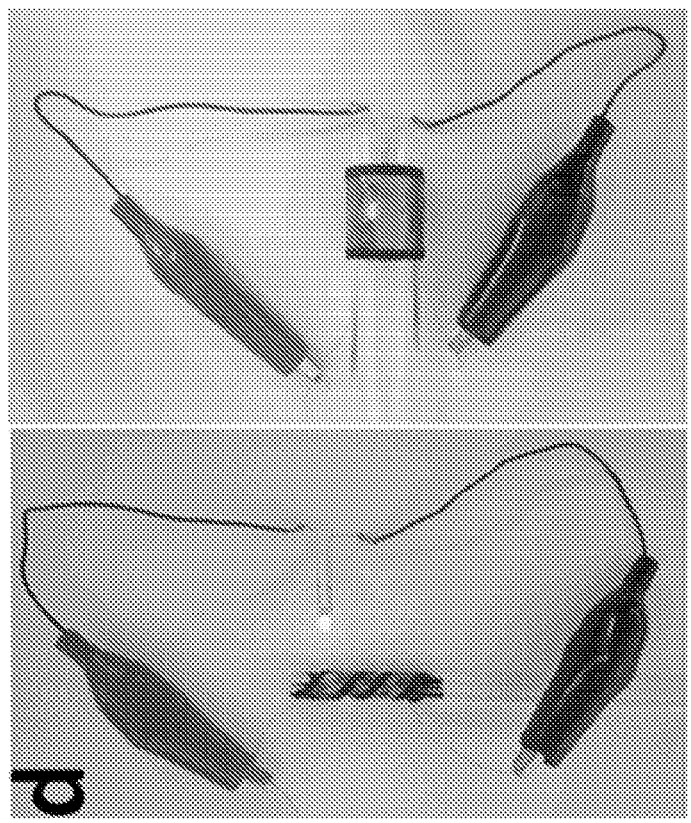
FIGS. 5c and 5d present photographs demonstrating the optical transparency and mechanical flexibility of a large scale CNC supercapacitor film. Note that an LED is turned on and remains stable even after the film is helically wrapped around differently sized glass tubes. The large area CNC supercapacitor film (3 cm by 1.5 cm) overlying the smartphone screen demonstrates optical transparency, and the CNC capacitor films (3 cm by 1.5 cm and 3.5 cm by 0.5 cm) helically wrapped around two differently sized glass tubes (1.6 cm and 0.5 cm diameter) show excellent performance during power delivery in these configurations.
Figure 5C:
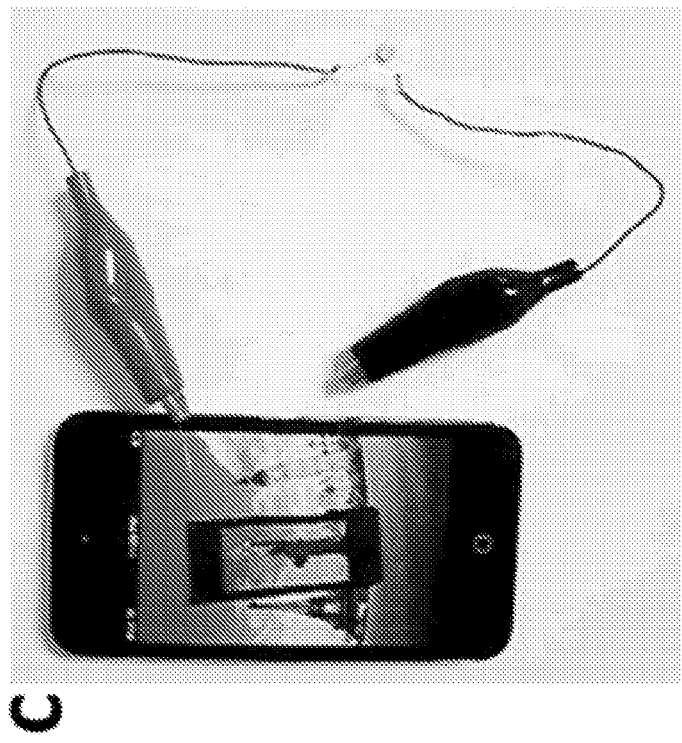

The performance of supercapacitors of the invention as flexible and transparent devices is demonstrated in FIGS. 5c and 5d. A prototype supercapacitor film of large area (3 cm by 1.5 cm) was fabricated and a light-emitting diode (LED, working potential 1.5V) was successfully turned on for 20 min after being charged for 15 min at 2.5V. Such devices also can be integrated into unique applications where power delivery along with transparency or mechanical flexibility would be advantageous. For example, they could be used as thin coatings on windows, screens, structures with different geometries, etc. As a demonstration, a transparent supercapacitor device of the invention was placed on a smart phone screen, and during operation of the device one could clearly see the concurrent transparent nature of the device (FIG. 5c). In another demonstration, two devices were helically wrapped around differently sized glass tubes in high curvature yet showing excellent performance during operation (FIG. 5d).

EXAMPLES

Example 1. Specific Surface Area and Mass of CNCs

The calculations are based on the following hypotheses. (1) Surface area of cap of a nanocup is consistent with that of mouth of a nanocup pore and curvature of the cap is ignored, and thus both the hexagonal cell and cylinder area in a nanocup geometry are involved into the calculation of the mass, (2) only the surface of carbon layer exposed to the electrolyte is taken into account for specific surface area, (3) the length of the C—C bonds in the curved graphene sheets is the same as in the planar sheet ($d_{c-c}$=0.1421 nm), (4) the nanocups are composed of concentric shells and the inter-shell distance is $d_{s-s}$=0.34 nm, (5) the total carbon layers are about 30 walls in 10 nm thickness, (6) the inter-pore distance is about 105 nm and the total nanocups in 1×1 cm² geometrical area are 1×10$^{10}$, (7) the specific surface area of one side of a graphene sheet is 1315 m²/g$^{27}$.

The surface of a carbon layer exposed to the electrolyte is: $S_e = \pi L d_e + S_{hc}$.

The surface of the entire graphene sheet in one nanocup geometry is:

$$S_c = \pi L[nd - 2d_{s-s}\Sigma_{i=1}^{n-1}i] + nS_{hc}.$$

The total mass of one nanocup geometry is: $W_c = S_c/1315$, and thus the specific surface area of one nanocup geometry is: $SSA_{CNC} = S_e/W_c$, where L is length of a nanocup, d is diameter, $d_e$ means inner diameter for concave type and outer diameter for convex type nanocup, $S_{hc}$ is surface of the hexagonal cell, and n is the number of graphene shells.

The calculated SSA is 39, 49 and 63 m²/g for nanocups of the concave, convex and branched convex type, respectively. The fact that each shell addition does not produce a strong increase of the surface area of the CNCs is due to the much larger increase of its mass. However, the surface of a carbon layer exposed to the electrolyte for branched CNCs is 2.9 times and 2.3 times larger than that for concave and convex CNCs.

Example 2. Characterization of Transparent and Flexible Supercapacitor Devices

Electrochemical properties of CNCs-based supercapacitors were analyzed using cyclic voltammetry (CV), galvanostatic charge-discharge (CD) and cyclic stability. The CV curves of CNC-based devices were measured between 0 and 1V with various scan rates in the range of 10-500 mVs$^{-1}$. The CV curves displayed nearly rectangular shape even at very high scan rates (see FIGS. 4a (branched convex), 6a (concave), and 6d (convex)). The CD curves were obtained at a constant current density of 4.2 µAcm$^{-2}$ for the concave CNCs (FIG. 6b) and 5 µAcm$^{-2}$ for convex CNCs (FIG. 6e) and the branched convex CNCs (FIG. 4b). The capacitance and internal resistance values were determined from the slope and the initial voltage drop of the galvanostatic CD curves, respectively. The capacitances C were calculated from the galvanostatic discharge curves using C=i/−[ΔV/Δt] A=i/−slope×A, where C is the capacitance, i is the discharge current, the slope is the slope of the discharge curve after the iR drop, and A is the geometrical area of CNCs on the electrode. The cyclic stability was obtained by performing charge-discharge of the flat and bent CNC supercapacitor over 10,000 cycles. It is apparent that the materials retained good stability over a large number of charging-discharging cycles. The efficiency (q), the power density (P) and energy density (E) of the CNC-based supercapacitors were calculated using $\eta=(t_{discharging}/t_{charging})\times 100$, $P=V^2/[4 RV_{vol}]$ and $E=0.5 CV^2/V_{vol}$, respectively, where $t_{discharging}$ is the discharging time, $t_{charging}$ is the charging time, $V_{vol}$ is the volume including area and thickness of two CNC films and a polymer electrolyte, C is the measured device capacitance, and R is the internal resistance, respectively.

Example 3. Temperature Dependence of Capacitance

The temperature dependence of capacitance behavior was measured for branched CNC supercapacitor devices, and the results are shown in FIG. 7. The experimental curves (CV and CD curves) show a gradual linear rise in the capacitance values with temperature up to 80° C. A significant increase (about three times) of the capacitance values with temperature was observed, up to 1220 µF cm$^{-2}$ at 80° C., whereas the capacitance was only 380 µF cm$^{-2}$ at 20° C. Normalized capacitance and internal resistance were determined from the slope and the initial voltage drop at the beginning of discharge in galvanostatic CD curves, respectively.

Example 4. Effect of Form on Capacitance

Figure 8A:
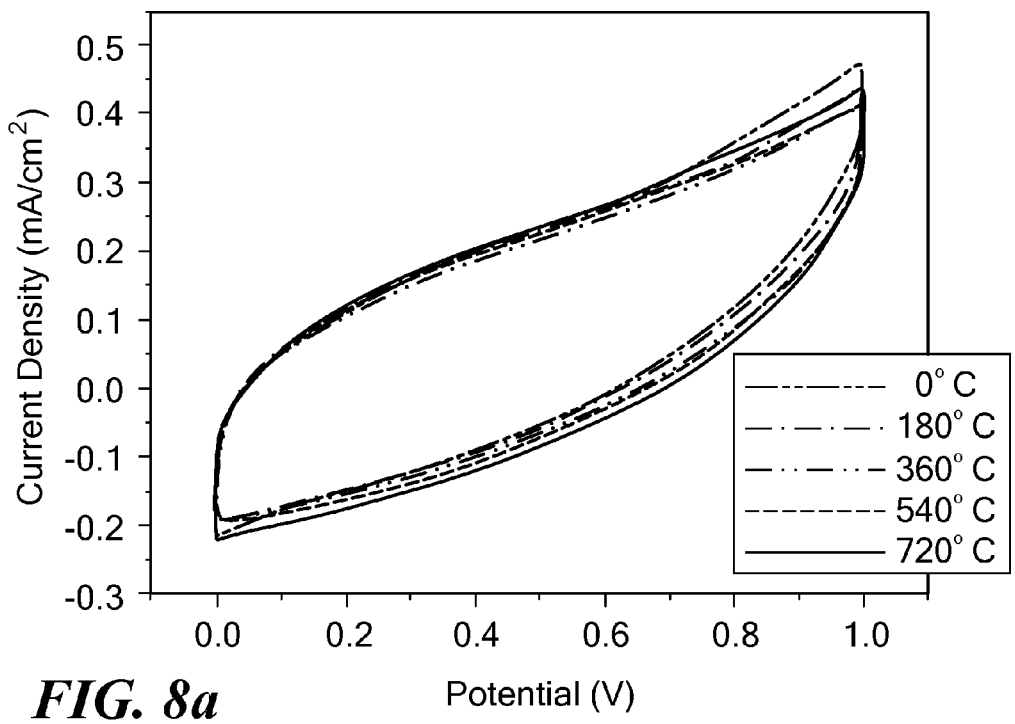
In FIG. 8a, the order of the curves is 720°, 540°, 360°, 180°, and 0° from bottom to top in the lower curve.
Figure 8B:
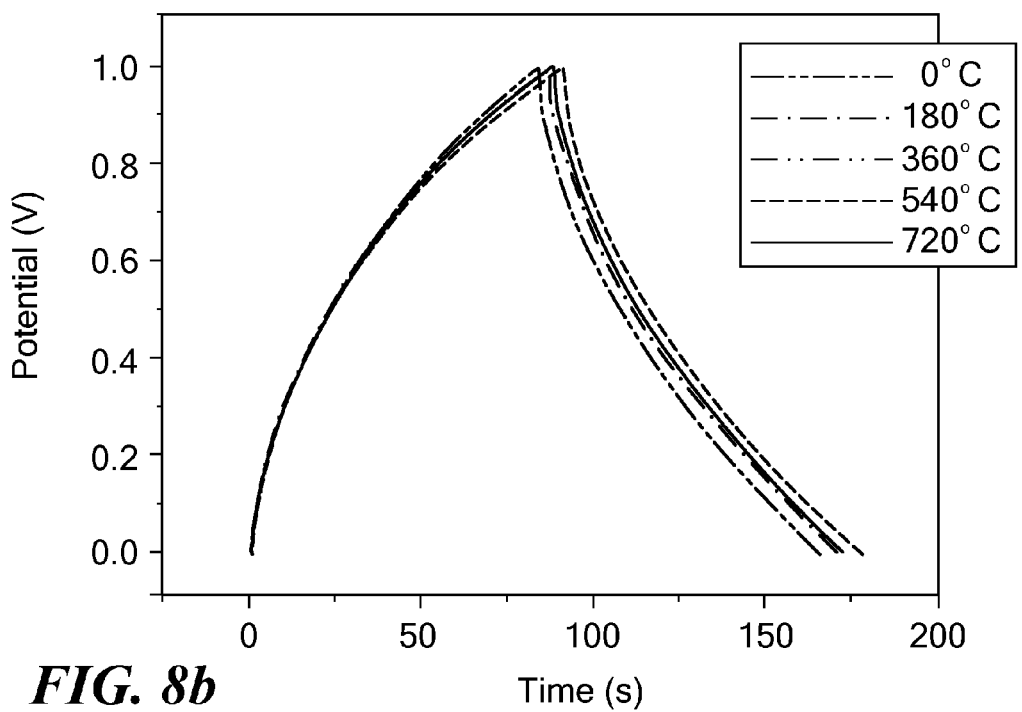
In FIG. 8b, the order of the curves is 0°, 180°, 360°, 720°, and 540° from left to right on the right hand side (discharge curve).

CNC supercapacitor devices (3.5 cm by 0.5 cm) were wrapped around a glass tube (0.5 cm diameter) to different extents (rolled around the tube up to three times), and their capacitance properties were determined. The results are shown in FIG. 8. The CV properties are shown in FIG. 8a, and the CD properties are shown in FIG. 8b. The results demonstrated that the superior supercapacitor properties of the device were retained even after being helically rolled up to 720°. This excellent mechanical flexibility and integrity is believed to be due to the effective conformal filling of polymer electrolyte into the nanostructured graphitic film.

As used herein, "consisting essentially of" does not exclude materials or steps that do not materially affect the basic and novel characteristics of the claim. Any recitation herein of the term "comprising", particularly in a description of components of a composition, elements of a device, or steps of a method, can be exchanged with "consisting essentially of" or "consisting of". As used herein, "about" refers to a numerical value within 10% higher or lower than the stated value.

While the present invention has been described in conjunction with certain preferred embodiments, one of ordinary skill, after reading the foregoing specification, will be able to effect various changes, substitutions of equivalents, and other alterations to the compositions and methods set forth herein.

REFERENCES

1. Xia, J., Chen, F., Li, J. & Tao, N. Measurement of the quantum capacitance of graphene. *Nature Nanotech.* 4, 505-509 (2009).
2. Simon, P. & Gogotsi, Y. Materials for electrochemical capacitors. *Nature Mater.* 7, 845-854 (2008).
3. Levi, M. D., Salitra, G., Levy, N., Aurbach, D. & Maier, J. Application of a quartz-crystal microbalance to measure ionic fluxes in microporous carbons for energy storage. *Nature Mater.* 8, 872-875 (2009).
4. Futaba, D. N. et al. Shape-engineerable and highly densely packed single-walled carbon nanotubes and their application as super-capacitor electrodes. *Nature Mater.* 5, 987-994 (2006).
5. Miller, J. R., Outlaw, R. A. & Holloway, B. C. Graphene double-layer capacitor with ac line-filtering performance. *Science* 329, 1637-1639 (2010).
6. Zhu, Y. et al. Carbon-based supercapacitors produced by activation of graphene. *Science* 332, 1537-1541 (2011).
7. Chmiola, J., Largeot, C., Taberna, P. L., Simon, P. & Gogotsi, Y. Monolithic carbide-derived carbon films for micro-supercapacitors. *Science* 328, 480-483 (2010).
8. Pandolfo, A. G. & Hollenkamp, A. F. Carbon properties and their role in supercapacitors. *J. Power Sources* 157, 11-27 (2006).
9. Zhang, L. L. & Zhao, X. S. Carbon-based materials as supercapacitor electrodes. *Chem. Soc. Rev.* 38, 2520-2531 (2009).
10. Izadi-Najafabadi, A. et al. High-power supercapacitor electrodes form single-walled carbon nanohorn/nanotube composite. *ACS Nano* 5, 811-819 (2011).
11. Kaempgen, M., Chan, C. K., Ma, J., Cui, Y. & Gruner, G. Printable thin film supercapacitors using single-walled carbon nanotubes. *Nano Lett.* 9, 1872-1876 (2009).
12. Wang, Y. et al. Supercapacitor devices based on graphene materials. *J. Phys. Chem. C* 113, 13103-13107 (2009).
13. Biswas, S. & Drazal, L. T. Multilayered nanoarchitecture of graphene nanosheets and polypyrrole nanowires for high performance supercapacitor electrodes. *Chem. Mater.* 22, 5667-5671 (2010).
14. Liu, C., Yu, Z., Neff, D., Zhamu, A. & Jang, B. Z. Graphene-based supercapacitor with an ultrahigh energy density. *Nano Lett.* 10, 4863-4868 (2010).
15. Stoller, M. D., Park, S. J., Zhu, Y. W., An, J. H. & Ruoff, R. S. Graphene-based ultracapacitors. *Nano Lett.* 8, 3498-3502 (2008).
16. Frackowiak, E. Carbon materials for supercapacitor application. *Phys. Chem. Chem. Phys.* 9, 1774-1785 (2007).
17. Pech, D. et al. Ultrahigh-power micrometer-sized supercapacitors based on onion-like carbon. *Nature Nanotech.* 5, 651-654 (2010).
18. Yoo, J. J. et al. Ultrathin planar graphene supercapacitors. *Nano Lett.* 11, 1423-1427 (2011).
19. Gao, W. et al. Direct laser writing of micro-supercapacitors on hydrated graphite oxide films. *Nature Nanotech.* 6, 496-500 (2011).
20. El-kady, M. F., Strong, V., Dubin, S. & Kaner, R. B. Laser scribing of high-performance and flexible graphene-based electrochemical capacitors. *Science* 335, 1326-1330 (2012).
21. Meng, G. et al. A general synthetic approach to interconnected nanowire/nanotube and nanotube/nanowire/nanotube heterojunctions with branched topology. *Angew. Chem. Int. Ed.* 48, 1-6 (2009).
22. Kang, D. W. & Suh, J. S. Fabrication temperature effect of the field emission from closed and open tip carbon nanotube arrays fabricated on anodic aluminum oxide films. *J. Appl. Phys.* 96, 5234-5238 (2004).
23. Izadi-Najafabadi, A. et al. Extracting the full potential of single-walled carbon nanotubes as durable supercapacitor electrodes operable at 4V with high power and energy density. *Adv. Energy Mater.* 22, E235-241 (2010).
24. Ragone, D. V. Review of battery systems for electrically powered vehicles. *Mid-year meeting of the society of automotive engineers*, Detroit, Mich., May 20-24 (1968).
25. Webster, J. G. *Wiley Encyclopedia of Electrical and Electronics Engineering vol. III.* Wiley, New York (1999).
26. Chun, H. K. et al. Engineering low-aspect ratio carbon nanostructure: nanocups, nanorings, and nanocontainers. *ACS Nano* 3, 1274-1278 (2009).
27. Peigney, A., Laurent, Ch., Flahaut, E., Bacsa, R. R. & Rousset, A. Specific surface area of carbon nanotubes and bundle of carbon nanotubes. *Carbon* 39, 507-514 (2001).

What is claimed is:

1. A supercapacitor device comprising:
   a pair of electrodes, each electrode comprising a graphitic carbon film, the film comprising an array of nanocup structures; and
   an electrolyte material disposed between the electrodes; wherein a first face of each carbon film contacts the electrolyte material and a second face of each carbon film is disposed opposite to the first face; wherein the nanocups have a convex geometry on the first face of the film, and wherein the convex nanocup structures further comprise one or more branched or unbranched carbon nanotubes extending from the nanocup structures into the electrolyte material.

2. The supercapacitor device of claim 1, wherein the nanocup structures have a diameter in the range from about 10 nm to about 500 nm.

3. The supercapacitor device of claim 1, wherein the nanocup structures have a height above the film in the range from about 30 nm to about 1000 nm.

4. The supercapacitor device of claim 1, wherein the film has a thickness in the range from about 5 nm to about 200 nm.

5. The supercapacitor device of claim 1, wherein the nanotubes have a diameter in an unbranched portion from about 20 nm to about 30 nm.

6. The supercapacitor device of claim 1, wherein the nanotubes have a length from about 200 nm to about 500 nm.

7. The supercapacitor device of claim 1, wherein the film is fabricated by a process comprising chemical vapor deposition of acetylene gas onto a template.

8. The supercapacitor device of claim 7, wherein the template is an anodized aluminum oxide template.

9. The supercapacitor device of claim 1, wherein the electrolyte material comprises polyvinyl alcohol and phosphoric acid and is from 8 µm to about 20 µm thick.

10. The supercapacitor device of claim 1 that is flexible.

11. The supercapacitor device of claim 1 that is transparent at visible wavelengths of light.

12. The supercapacitor device of claim 1 that is both flexible and transparent at visible wavelengths of light.

13. The supercapacitor device of claim 1 that has a specific capacitance of at least about 70 pF/cm$^2$.

14. The supercapacitor device of claim 1 that has a specific capacitance of at least about 400 pF/cm$^2$.

15. The supercapacitor device of claim 1, wherein the electrodes consist of said graphitic carbon film.

16. The supercapacitor device of claim 1, wherein said graphitic carbon film serves as both electrode and current collector.

17. The supercapacitor device of claim 1, further comprising a protective layer deposited onto the second face of each graphitic carbon film.

18. The supercapacitor device of claim 17, wherein the protective layer comprises polydimethylsiloxane (PDMS).

19. The supercapacitor device of claim 1 which is a component of a circuit.

20. The supercapacitor device of claim 19, wherein the circuit is a power delivery circuit.

21. A method of fabricating a supercapacitor device having convex or branched convex nanocup geometry, the method comprising the steps of:
(a) providing a template comprising an array of nanochannels;
(b) depositing a graphitic carbon film onto the template using a chemical vapor deposition process, whereby a first face of the carbon film contacts the template, and the carbon film comprises an array of nanocup structures, each nanocup structure corresponding to a nanochannel of the template;
(c) depositing a protective layer onto a second face of the carbon film, the protective layer comprising a polymer and the second face of the carbon film disposed opposite the first face of the carbon film;
(d) removing the template, leaving an electrode comprising the carbon film attached to the protective layer;
(e) repeating steps (a) through (d) to produce a second electrode;
(f) depositing a layer of electrolyte material onto the first face of each of the two electrodes; and
(g) joining the two electrodes so that their layers of electrolyte material are combined to form a single layer of electrolyte material, whereby the supercapacitor device is fabricated.

22. A method of fabricating the supercapacitor device having concave nanocup geometry, the method comprising the steps of:
(a) providing a template comprising an array of nanochannels;
(b) depositing a graphitic carbon film onto the template using a chemical vapor deposition process, whereby a first face of the carbon film contacts the template, and the carbon film comprises an array of nanocup structures, each nanocup structure corresponding to a nanochannel of the template;
(c) depositing a first protective layer onto a second face of the carbon film, the first protective layer comprising a polymer and the second face of the carbon film disposed opposite the first face of the carbon film;
(d) removing the template and replacing it with a second protective layer deposited on the first face of the carbon film;
(e) removing the first protective layer exposing the second face of the carbon film;
(f) repeating steps (a) through (e) to produce a second electrode;
(g) depositing a layer of electrolyte material onto the second face of each of the two electrodes;
(h) joining the two electrodes so that their layers of electrolyte material are combined to form a single layer of electrolyte material, whereby the supercapacitor device is fabricated.

* * * * *